United States Patent Office 3,389,458
Patented June 25, 1968

3,389,458
CRYSTALLIZED GLASS CERAMIC COATINGS
George W. Ostrander, Muskegon Heights, and Wesley W. Pendleton, Muskegon, Mich., assignors to Anaconda Wire and Cable Company, a corporation of Delaware
Filed May 21, 1964, Ser. No. 369,126
7 Claims. (Cl. 29—605)

Our invention relates in inorganic coatings and encapsulants and particularly to such coatings comprised of crystallized glass ceramics.

It has been disclosed in applications Ser. Nos. 173,115; 207,882; 178,349; and 248,328, now Patent Nos. 3,273,-225; 3,343,984; 3,294,731; and 3,238,025 respectively, assigned to the assignee of the present invention, to make electrical apparatus for service at extremely high temperatures such as 500° C. and even 850° C. by insulating wire conductors with combinations of organic enamel and glass, forming the conductors into coils, burning off the enamel, and fusing the glass into a continuous insulating barrier. Obviously the glass must fuse at temperatures below the melting point of the conductors which are usually copper or silver.

At room temperatures common glasses provide excellent electrical resistance but at temperatures close to their fusion points the electrical resistivity of glass drops sharply and so does the resistance to cut through or the tendency of the wires to push through the softened glass and short circuit to adjacent turns. It would, therefore, be desirable to use very high melting glass compositions for the insulation and encapsulation of electrical apparatus, and preferably the glass should have a fusion point at least 200 degrees above the operating temperature of the coil. If the coil is operated at temperatures close to the melting point of the conductors there has not been, prior to the present invention, any means of fusing the desired high melting point insulation or encapsulant glass insulation on the conductors.

The use of crystallizable glass does not solve the problem, for the finely divided glass will, of course, crystallize before it fuses, because the necessary nuclei are formed in the glass when it cools prior to being formed into a frit or fiber. The glass will not fuse, then, until it reaches the fusion point of the crystallized material which will, perforce, be very high.

We have discovered the desired structure can be made by coating the conductors with a crystallizable glass which does not have the nucleating agent in the glass composition itself but has the powdered nucleating agent added to the frit of slurry and intimately mixed with the glass particles. The glass is then fused. This can be done at a relatively low temperature because the glass has not crystallized. The apparatus is, however, held at the fusion temperature or slightly lower, for a period of time sufficient for the particles of nucleating agent which have been trapped in the fused glass matrix to dissolve into the glass. The temperature is then lowered so that the agent precipitates out in the form of nuclei, and then once again raised, slowly, to effect a growth of glass crystals. The ceramic material thus formed will not again soften at its original fusing temperature and it will have much better dielectric properties, such as low dielectric loss, at temperatures close to the original fusion temperature than the uncrystallized glass.

It will be realized that although our invention has great utility for electrical apparatus it also provides a means for applying a crystalline ceramic glaze to other surfaces at much lower temperatures than was possible by known methods.

We propose by our invention to apply crystalline coatings at relatively low temperatures.

We propose by our invention to insulate electrical conductors with fused ceramic coatings having softening points exceeding the melting points of the conductors.

We propose by our invention to make electrical apparatus with improved high-temperature dielectric properties.

For coating apparatus in accordance with our invention we have also invented a slip comprising a suspension in water of finely divided particles of a glass composition free from nucleating agents, but capable of crystallization upon the addition of a suitable agent. The slip also comprises finely divided particles of a nucleating agent for the glass composition, such as $TiO_2$. This agent is uniformly dispersed among the particles of glass so that after the water in the slip is evaporated the nucleating agent can be dissolved into the glass, precipitated to form nuclei, and the glass then crystallized around these nuclei. A slip of this type using this method has particular application for encapsulating electrical apparatus and for enamelling metal surfaces with a ceramic, crystallized-glass enamel but without the application of the high temperatures that would be necessary to fuse the same glass if it were crystallized. This is true because at the time of fusing of the particles into a continuous coating or matrix they are free from nuclei and the temperature of fusion of the uncrystallized glass is all that is required. After crystallization the glazed product can be reheated beyond the original fusion temperature without softening or distorting the finish, which has now become ceramic.

In the embodiment of our invention to the direct insulation of electrical conductors for use in coils, instead of a water slip the glass frit and nucleating particles are suspended in an organic enamel solution and uniformly dispersed therein, preferably by ball-milling.

We have found that a glass composition of about:

Example

| | Percent |
|---|---|
| $SiO_2$ | 44.7 |
| $Al_2O_3$ | 11.8 |
| $CaF_2$ | 3.8 |
| $CaO$ | 5.6 |
| $P_2O_5$ | 4.7 |
| $K_2O$ | 18.5 |
| $Na_2O$ | 8.0 |
| $Li_2O$ | 2.9 | can be shattered to form a frit with a fusion point of 700° C. When 85 parts of the glass are ball-milled with 15 parts of $TiO_2$, and applied either as an enamel coating on clad copper wire or as an encapsulant over an electrical coil, the coating can be fused by raising the temperature to 750° C. and holding it at this temperature for ½ hour. This can be done, of course, without danger of melting the copper component of the coil.

The temperature is then lowered to 300° C. and held at this temperature for 10 minutes, whereafter it is reheated to 700° C. at a rate of 10° per minute to complete the crystallization.

Our invention has particular utility for the manufacture of high-temperature electrical apparatus wherein the glass, such as the glass of the example, is suspended along with a nucleating agent such as $TiO_2$ in an enamel solution. In this case wire is coated with the suspension and oven dried to form an insulated conductor which is not superficially distinguishable from low-temperature magnet wire. The wire is then formed into coils and the enamel is burned off. During this heating process, if the glass component of the enamel were nucleated, and the glass were crystallizable, crystallization would occur before the glass had a chance to fuse and it would raise the fusion point. By omitting the TiO₂ from the glass composition and introducing it in place only after the glass has fused, we have found a method of preventing premature crystallization.

A fuller understanding of our invention may be gained from the appended drawing.

Figure 1:
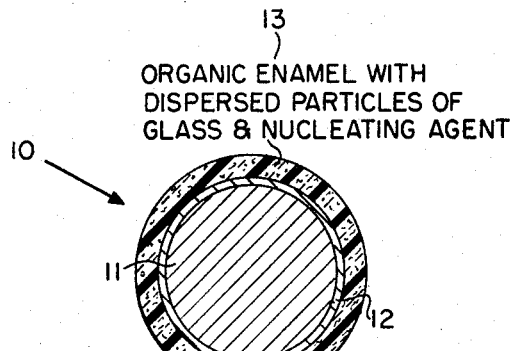
FIGURE 1 shows a section of a conductor made in accordance with our invention.

FIGURE 1 shows an illustrative embodiment of our invention comprising a clad copper conductor, indicated generally by the numeral 10, coated and cured and ready for forming into coils. Insulated conductor of this type is sold to apparatus manufacturers who can then form coils and follow through the remaining steps of the method of FIGURE 3. The conductor 10 has a copper wire core 11 sheathed in an oxidation protective layer of nickel 12. Suitable conductors have been described in application Ser. Nos. 248,328 now Patent 3,238,025 and 354,885 now Patent 3,282,660 assigned to the assignee of the present invention. Over the layer 12 there has been applied a continuous uniform enamel insulation 13 in which finely divided particles of crystallizable glass, with the approximate composition of the example hereinabove cited, and particles of $TiO_2$, a nucleating agent for the glass, are uniformly dispersed.

Figure 3:
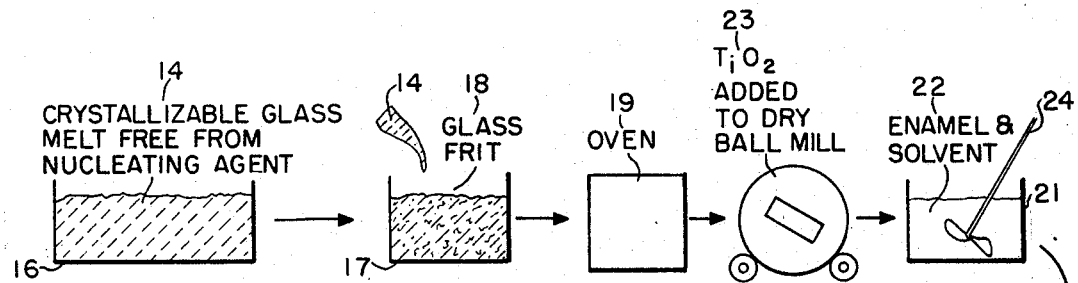
FIGURE 3 shows a schematic representation of the method of our invention.

FIGURE 3 shows the method of making electrical apparatus to our invention and the conductor 10 of FIGURE 1 corresponds to the product emerging from the wire coating step shown in FIGURE 3. The steps of this method comprise the melting of a crystallizable glass batch 14 free from nucleating agent, in a crucible 16, quenching and shattering of this melt in a water tank 17 to form a glass frit 18.

Figure 2:
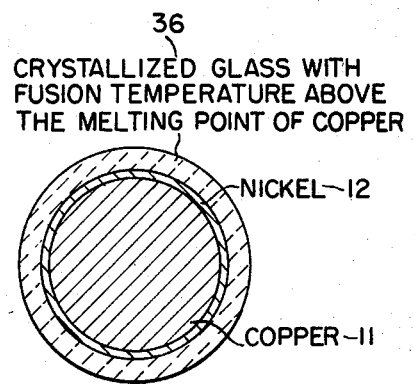
FIGURE 2 shows a section of the conductor of FIGURE 1 after processing in accordance with our invention.

This is dried in a drying oven 19 to remove the water and mixed with $TiO_2$ 23 in the proportions 15% $TiO_2$, 85% glass. Thence the mixture is dry ball milled to pass 200 mesh screen and introduced into a container 21 of magnet wire enamel 22. A suitable enamel is manufactured by the Dow Corning Corp. as DC 1090 silicone and comprises about 80% of polyethylene terephthalate resin and 20% of silicone resin dissolved in xylene to a 40% solids content. Other enamels included in the scope of our invention are epoxies, polyvinyl acetals, polyamides, polyimides, polyurethanes, acrylics and cellulosics, all of which have been used for low temperature magnet wire coatings. We have found that at least 10 parts of $TiO_2$ are necessary while excess $TiO_2$ will not dissolve into the glass but forms a somewhat porous ceramic structure when bonded by the glass moiety. Beyond 25 parts of $TiO_2$ the advantages of our invention of a continuous ceramic crystallized-glass coating will, however, be largely lost. From the container 21 where it has been intimately mixed by a stirrer 24 the solution 22 is removed to a wet ball mill 26 and ball-milled for an extended period, such as a week, to obtain an intimate uniform dispersion of the glass and nucleating agent particles. Then the solution is applied to wire in a conventional enamelling oven 27 where bare wire 28 is paid from a spool 29 and the coated wire 10 is taken up on another spool 31. It will be understood that, in order to build the enamel coating 13 on the wire 10 a plurality of coats may need to be applied. At this point the insulated wire may be formed into coils immediately, but it is most commonly stored on the spools 31 and shipped to an electrical apparatus plant that may be distinct from the wire insulating plant. Thence the wire 10 is wound into a coil 32 from the spool 31. This coil is represented diagrammatically in FIGURE 3 but it may be associated with a coil form and other elements of the electrical apparatus which do not constitute an element of this invention except that they must be capable of withstanding the oven temperatures to which the coil is subsequently subjected. The coil 32 is placed in a vacuum oven 33 where it may be subjected to alternate combustion and vacuum to remove the organic constituents of the enamel 13. This may be accomplished at a temperature of 500°C., with 15 minute cycles of air and vacuum, the number of cycles depending upon the coil dimensions. For example, two cycles are sufficient for very small coils while four to six cycles may be required for large coils. When the resinous material has been completely removed, the coil is fired for 30 minutes at 750° C. to allow the $TiO_2$ to diffuse into the glass coating and dissolve therein. This firing also fuses the glass particles into a continuous coating that fully insulates the conductor but which is amorphous and would, if no further process steps were taken to cause crystallization, always have rather poor electrical properties at temperatures near the fusion temperature. The above-mentioned combination of time and temperature is appropriate to the glass composition of the example but it will be understood that crystallizable glasses of different composition having different fusion points will be treated at different temperatures within the scope of our invention. In any event the dissolving temperature is selected to be as high as possible without causing undue flowing or distortion of the glass insulation. The coil 32 is then permitted to cool to a temperature of 300° C. for a period of 10 minutes to precipitate the $TiO_2$ in the form of nuclei in the glass. Thereafter the coil is reheated at a rate of 10° C. per minute to a temperature of 700° C. at which it is held for 20 minutes to crystallize the glass around these nuclei and form the crystallized-glass ceramic insulation 36 (FIGURE 2). This crystallization temperature is generally preferred to be 50–100° C. below the fusion temperature. Other glass compositions will require different cooling and reheating cycles within the scope of our invention but in each case the glass must be cooled sufficiently to precipitate $TiO_2$ nuclei in large enough numbers to support crystallization, and reheating should occur at a pace sufficiently slow for crystals to grow and to a sufficient degree to crystallize all the crystallizable material in the glass matrix. The steps of fusing, dissolving the $TiO_2$, cooling, and recrystallizing are conveniently performed in a single oven 34. A disclosure of the mechanism of the crystallization of glass around $TiO_2$ nuclei is given in the patent to Stookey, 2,920,971. If it is desired to encapsulate the coil, or electrical apparatus in which it is comprised, with a crystallized glass ceramic encapsulant, a glass slip is prepared by dry ball milling the frit and $TiO_2$ in a ball mill 37 and adding water to form a slip in a tank 38. The slip contains the same glass composition and proportion of nucleating powder to glass as the enamel used for insulation. Then the solids content of the slip is increased by evaporating some of the water, and the coil is coated with the slip at a station 39, dried in a drying oven 41, and then heated through the same fusing, cooling, and reheating cycles as was done originally for the insulation. FIGURE 3 shows a process wherein the encapsulant is applied over the fully treated, ceramic insulated coil. However, an even more preferable method is to apply the encapsulating slip prior to the vacuum oven step in which the enamel is burned off, dry, and then follow through by fusing in the oven 34 etc. as shown. It is even possible to apply the encapsulant to the wire as it is being formed into a coil and then proceed with drying and decomposing the enamel. When the encapsulant is thus applied to the coil before fusing the insulation, the fusion, dissolving of $TiO_2$, precipitation of nuclei, and growth of crystals occur simultaneously in both the insulation and encapsulant.

Figure 4:
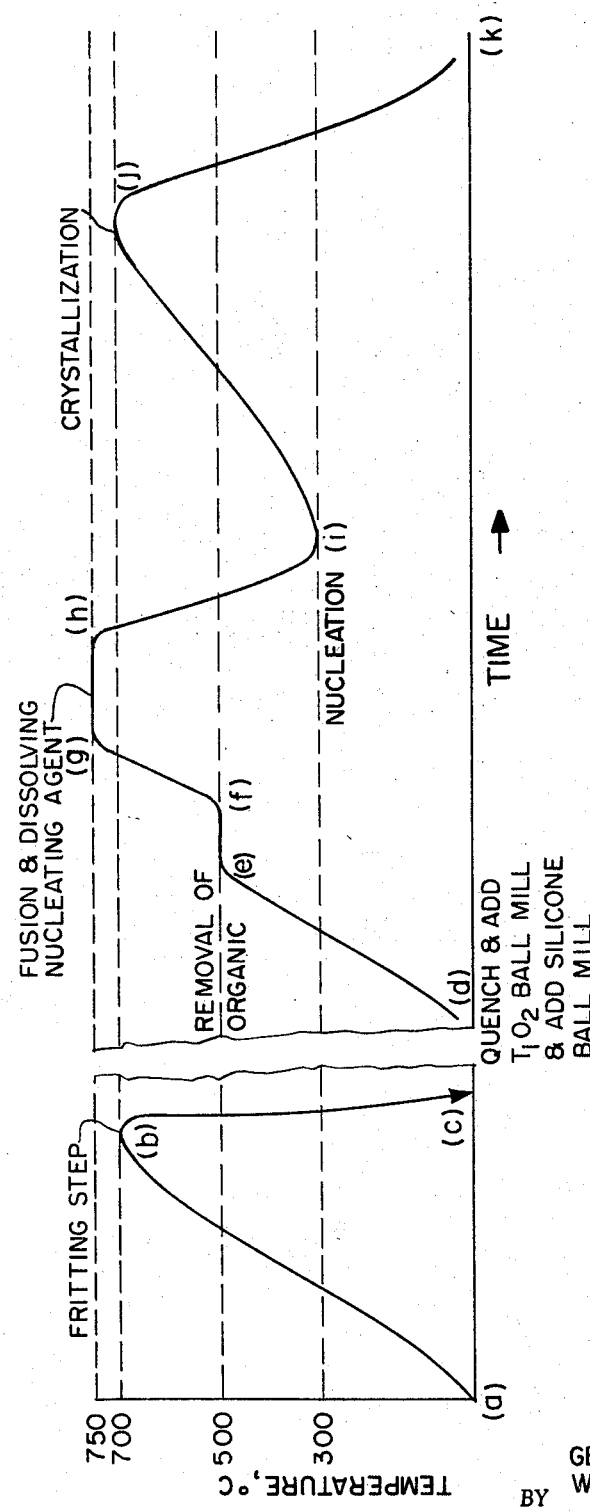
FIGURE 4 shows a time-temperature diagram of the method of our invention.

These steps can be further clarified by reference to the time-temperature diagram of FIGURE 4. At point $a$ of the figure the glass is at room temperature. It is brought up to 700° C. at $b$ for fritting and then quenched at $c$ to shatter the frit. At $d$ the enamelled wire has been formed into a coil and the organic material is removed during the time cycle *e–f*. Thence the temperature is raised to 750° C. at *g* to fuse the glass and dissolve the $TiO_2$. At the time *h* the temperature is reduced to 300° C. at *i* to nucleate the dissolved $TiO_2$. Thence the temperature is raised *slowly* to 700° C. to complete the crystallization at *j*. At this point the glass ceramic could be heated to 950° C. before it fused, but it is allowed to cool to room temperature at *k*.

We have invented a new and useful composition, article and method for which we desire an award of Letters Patent.

We claim:

1. The method of coating an article with a continuous coating of crystallized glass comprising the steps of:
   (A) forming a glass melt
      (a) free from effective amounts of dissolved nucleating agents and
      (b) capable of crystallization upon the addition of a nucleating agent, and
   (B) effecting diminution of said glass melt to form a glass powder,
   (C) suspending said glass powder in a liquid medium along with particles of a nucleating agent for said glass in an amount sufficient to perform a nucleating function,
   (D) intimately mixing said glass powder and said particles in said medium to form a uniform dispersion,
   (E) coating said article with said dispersion,
   (F) heating said article to remove said liquid medium,
   (G) further heating said article to fuse said glass powder into a continuous coating,
   (H) holding said coating at a temperature sufficient to dissolve said nucleating agent particles in said glass, and dissolving said agent,
   (I) cooling said coating so as to precipitate said nucleating agent in the form of nuclei in said glass, and
   (J) heating and thereby crystallizing said glass around said nuclei to form a ceramic coating on said article.

2. The method of coating an article with a continuous coating of crystallized glass having a softening point higher than the melting point of said article comprising the steps of:
   (A) forming a glass melt
      (a) free from effective amounts of dissolved nucleating agents, and
      (b) capable of crystallization upon the addition of a nucleating agent, and
      (c) having a melting point lower than the melting point of said article,
   (B) effecting diminution of said glass melt to form a glass powder,
   (C) suspending said glass powder in a liquid medium along with particles of a nucleating agent for said glass in an amount sufficient to perform a nucleating function,
   (D) intimately mixing said glass powder and said particles in said medium to form a uniform dispersion,
   (E) coating said article with said dispersion,
   (F) heating said article to remove said liquid medium,
   (G) further heating said article to fuse said glass powder into a continuous coating,
   (H) holding said coating at a temperature sufficient to dissolve said nucleating agent particles in said glass, and dissolving said agent,
   (I) cooling said coating so as to precipitate said nucleating agent in the form of nuclei in said glass, and
   (J) heating and thereby crystallizing said glass around said nuclei to form a ceramic coating having a melting point higher than the melting point of said article.

3. The method of making a crystallized glass ceramic insulated electrical apparatus comprising the steps of:
   (A) forming a glass melt
      (a) free from effective amounts of dissolved nucleating agents and
      (b) capable of crystallization upon the addition of a nucleating agent, and
   (B) effecting diminution of said glass melt to form a glass powder,
   (C) suspending said glass powder in an organic enamel solution along with particles of a nucleating agent for said glass in an amount sufficient to perform a nucleating function,
   (D) intimately mixing said glass powder and said particles in said solution to form a uniform dispersion,
   (E) coating a metallic wire conductor with said dispersion,
   (F) drying and hardening said enamel on said conductor,
   (G) forming said conductor into an electrical coil,
   (H) heating said coil so as to remove said enamel,
   (I) further heating said coil so as to fuse said glass into a continuous coating around said conductor,
   (J) holding said coating at a temperature sufficient to dissolve said nucleating agent into said glass, and dissolving said agent,
   (K) cooling said coil so as to precipitate said nucleating agent in the form of nuclei in said glass, and
   (L) heating and thereby crystallizing said glass around said nuclei to form a ceramic insulation around said conductor.

4. The method of making a crystallized glass ceramic encapsulated electrical apparatus comprising the steps of:
   (A) forming a glass melt
      (a) free from effective amounts of dissolved nucleating agents and
      (b) capable of crystallization upon the addition of a nucleating agent, and
   (B) shattering said glass melt to form a glass frit,
   (C) adding to said frit, particles of a nucleating agent for said glass in an amount sufficient to perform a nucleating function,
   (D) intimately mixing said particles and said frit in water to form a uniform dispersion,
   (E) covering an electrical coil with said dispersion,
   (F) heating said coil so as to evaporate the water from said dispersion,
   (G) further heating said coil so as to fuse the glass into a continuous structure surrounding said coil,
   (H) holding said coil at a temperature sufficient to dissolve said nucleating agent particles into said glass, and thus dissolving said agent,
   (I) cooling said coil so as to precipitate said nucleating agent in the form of nuclei in said glass, and
   (J) heating and thereby crystallizing said glass around said nuclei so as to encapsulate said coil in a ceramic envelope having a softening point higher than the melting point of elements of said coil.

5. A slip comprising a suspension in water of:
   (A) finely divided particles of a glass composition free from effective amounts of dissolved nucleating agents comprising about:

| | Percent by weight |
   |---|---|
   | $SiO_2$ | 44.7 |
   | $Al_2O_3$ | 11.8 |
   | $CaF_2$ | 3.8 |
   | $CaO$ | 5.6 |
   | $P_2O_5$ | 4.7 |
   | $K_2O$ | 18.5 |
   | $Na_2O$ | 8.0 |
   | $Li_2O$ | 2.9 |

(B) and, finely divided particles of a nucleating agent for said glass composition uniformly dispersed among said glass composition particles, whereby after the evaporation of the water in said slip, said nucleating agent can be dissolved into said glass, precipitated therein to form nuclei, and the glass crystallized around said nuclei.

6. The slip of claim 5 wherein said nucleating agent is $TiO_2$.

7. A slurry comprising:
(A) an organic solvent,
(B) an organic magnet wire enamel dissolved in said solvent to form a magnet wire enamel solution,
(C) finely divided particles of a glass composition suspended in said solution comprising about:

| | Percent by weight |
|---|---|
| $SiO_2$ | 44.7 |
| $Al_2O_3$ | 11.8 |
| $CaF_2$ | 3.8 |
| CaO | 5.6 |
| $P_2O_5$ | 4.7 |
| $K_2O$ | 18.5 |
| $Na_2O$ | 8.0 |
| $Li_2O$ | 2.9 |

(a) said composition being free from effective amounts of dissolved nucleating agents and
(b) capable of crystallization upon the addition of a nucleating agent in an amount sufficient to perform a nucleating function,
(D) finely divided particles of a nucleating agent for said glass composition suspended in said solution,
(a) said particles of nucleating agent being uniformly dispersed among said particles of glass composition whereby, after the removal of said solvent and enamel, said nucleating agent can be dissolved in said glass, precipitated therein to form nuclei, and the glass crystallized around said nuclei.

References Cited
UNITED STATES PATENTS

| | | | |
|---|---|---|---|
| 2,542,043 | 2/1951 | McIntyre | 106—48 XR |
| 2,662,020 | 12/1953 | Schofield et al. | 106—48 |
| 2,920,971 | 1/1960 | Stookey | 106—39 |
| 2,950,209 | 8/1960 | Hoffman | 106—48 |
| 2,998,320 | 8/1961 | Strimple | 106—48 |
| 3,028,447 | 4/1962 | Flaschen et al. | 117—231 X |
| 3,035,115 | 5/1962 | Heckel et al. | 174—110 |
| 3,037,828 | 6/1962 | Michael | 106—48 |
| 3,040,213 | 6/1962 | Byer et al. | 317—101 |
| 3,222,219 | 7/1965 | Saunder et al. | 106—48 |

LARAMIE E. ASKIN, *Primary Examiner.*

T. J. KOZMA, *Assistant Examiner.*